United States Patent
Inoue (10) Patent No.: US 9,120,177 B2
(45) Date of Patent: Sep. 1, 2015

(54) LASER MACHINING APPARATUS

(71) Applicant: Mitsubishi Electric Corporation, Chiyoda-ku, Tokyo (JP)

(72) Inventor: Takashi Inoue, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/127,014

(22) PCT Filed: Sep. 20, 2012

(86) PCT No.: PCT/JP2012/074055
§ 371 (c)(1),
(2) Date: Dec. 17, 2013

(87) PCT Pub. No.: WO2013/051401
PCT Pub. Date: Apr. 11, 2013

(65) Prior Publication Data
US 2014/0116997 A1 May 1, 2014

(30) Foreign Application Priority Data
Oct. 7, 2011 (JP) .................................. 2011-222771

(51) Int. Cl.
*B23K 26/14* (2014.01)
*B23K 26/00* (2014.01)
(Continued)

(52) U.S. Cl.
CPC ............. *B23K 26/08* (2013.01); *B23K 26/0665* (2013.01); *B23K 26/38* (2013.01)

(58) Field of Classification Search
CPC ............................ B23K 26/08; B23K 26/0892
USPC ............................. 219/67, 68, 121.67–121.72
See application file for complete search history.

(56) References Cited

U.S. PATENT DOCUMENTS

| 5,013,989 A | 5/1991 | Kurakake et al. |
| 5,432,316 A * | 7/1995 | Ito et al. .................... 219/121.83 |

(Continued)

FOREIGN PATENT DOCUMENTS

| CN | 1310073 A | 8/2001 |
| JP | 01-217605 A | 8/1989 |

(Continued)

OTHER PUBLICATIONS

International Search Report of PCT/JP2012/074055 dated Nov. 20, 2012.

(Continued)

*Primary Examiner* — Tu B Hoang
*Assistant Examiner* — Alba Rosario-Aponte
(74) *Attorney, Agent, or Firm* — Sughrue Mion, PLLC; Richard C. Turner (57) ABSTRACT

A laser machining apparatus includes a main control unit executing NC program; a laser oscillator oscillating laser light according to instruction from the main control unit; a distance sensor measuring distance L between a nozzle and a workpiece; a sensor-data processing unit sampling a measured value of the distance sensor; and a copying control unit moving a machining head to maintain the distance constant based the measured value, wherein the sensor-data processing unit samples the measured value with an operation period shorter than that of the main control unit and, when a portion corresponding to the through hole in the workpiece comes off and the distance becomes larger than a predetermined value during the inner hole machining, causes oscillation of laser light to be stopped by outputting a stop signal to the laser oscillator.

2 Claims, 7 Drawing Sheets

(51) Int. Cl.
*B23K 26/08* (2014.01)
*B23K 26/38* (2014.01)
*B23K 26/06* (2014.01)

(56) References Cited

U.S. PATENT DOCUMENTS

| | | | |
|---|---|---|---|
| 5,491,318 | A | 2/1996 | Sugawara et al. |
| 5,548,098 | A | 8/1996 | Sugawara et al. |
| 5,688,418 | A | 11/1997 | Yoshiyasu et al. |
| 5,994,668 | A * | 11/1999 | Sugahara et al. ........ 219/121.72 |
| 6,818,856 | B2 * | 11/2004 | Yamazaki et al. ....... 219/121.62 |
| 2005/0143861 | A1 * | 6/2005 | Watanabe et al. ............. 700/264 |
| 2006/0258047 | A1 | 11/2006 | Nishiwaki et al. |
| 2008/0193726 | A1 * | 8/2008 | Shimada et al. ........... 428/195.1 |

FOREIGN PATENT DOCUMENTS

| | | |
|---|---|---|
| JP | 01-278985 A | 11/1989 |
| JP | 06-269970 A | 9/1994 |
| JP | 07-284974 A | 10/1995 |
| JP | 08-267263 A | 10/1996 |
| JP | 09-136183 A | 5/1997 |
| JP | 2006-315017 A | 11/2006 |
| JP | 2011-025416 A | 2/2011 |

OTHER PUBLICATIONS

Communication dated Oct. 24, 2014 from the State Intellectual Property Office of the People's Republic of China in counterpart application No. 201280042493.4.

* cited by examiner

LASER MACHINING APPARATUS

CROSS REFERENCE TO RELATED APPLICATIONS

This is a National Stage of International Application No. PCT/JP2012/074055 filed Sep. 20, 2012, claiming priority based on Japanese Patent Application No. 2011-222771 filed Oct. 7, 2011, the contents of all of which are incorporated herein by reference in their entirety.

FIELD

The present invention relates to a laser machining apparatus.

BACKGROUND

Inner hole machining using laser machining is performed by setting a machining start point in a portion that is cut off as a waste, and emitting laser light to cut through the waste, starting from the machining start point, toward a part to be an edge of a through hole and follow the edge.

In laser machining, the cut slot, while it is thin, has a certain thickness and a force is applied to the material to be cut due to the pressure of the gas ejected from the machining nozzle; therefore, when inner hole machining is performed, the waste side comes off at the timing before the nozzle reaches the machining path end. Consequently, there is a problem in terms of quality that laser light irradiation becomes excessive near the machining end due to redundant laser light irradiation and this leads to discoloration of the end portion.

The slot width during laser machining changes due to the effects of, for example, the set cutting conditions and the ambient environment; therefore, it is difficult to always maintain a constant slot width. Consequently, it is not possible to create an NC program such that laser irradiation is stopped at the timing when the waste comes off.

Patent Literature 1 discloses a technology for detecting that laser machining is approaching the end point of the cutting portion by using, for example, a proximity sensor at the tip of the nozzle.

Patent Literature 2 discloses a technology for invalidating an anomaly detection signal so that machining does not stop near the machining end point.

CITATION LIST

Patent Literature

Patent Literature 1: Japanese Patent Application Laid-open H09-136183
Patent Literature 2: Japanese Patent Application Laid-open H06-269970

SUMMARY

Technical Problem

However, in Patent Literature 1, an objective is given of improving quality by changing a parameter that has a long response time, such as the assist gas condition; therefore, a high-processing speed is not required. Because processing needs to be performed in the order of one millisecond to prevent discoloration of the end portion, it is difficult to prevent discoloration using the technology disclosed in Patent Literature 1 and thus the processing speed is a problem.

The technology disclosed in Patent Literature 2 changes the control method immediately before the end of machining to invalidate the stoppage of the machining and does not contribute to improvement of the machining quality.

The present invention has been achieved in view of the above and an object of the present invention is to obtain a laser machining apparatus that prevents or reduces the occurrence of discoloration near the machining end portion when an inner hole is cut out.

Solution to Problem

In order to solve the above problems and achieve the object, the present invention is a laser machining apparatus that performs inner hole machining of forming a through hole in a workpiece by emitting laser light to the workpiece while moving a machining head, on which a nozzle is mounted, approximately circularly in accordance with an NC program, the apparatus including a main control unit that executes the NC program; a laser oscillator that oscillates the laser light in accordance with an instruction from the main control unit; a distance sensor that measures a distance between the nozzle and the workpiece; a sensor-data processing unit that samples a measured value of the distance sensor; and a copying control unit that moves the machining head such that a distance between the nozzle and the workpiece is maintained constant on a basis of a measured value of the distance sensor input from the sensor-data processing unit, wherein the sensor-data processing unit samples a measured value of the distance sensor with an operation period shorter than an operation period of the main control unit and, when a portion corresponding to the through hole in the workpiece comes off and a distance between the nozzle and the workpiece becomes larger than a predetermined value during the inner hole machining, causes the laser oscillator to stop oscillation of the laser light by outputting a stop signal to the laser oscillator.

Advantageous Effects of Invention

According to the present invention, an effect is obtained where cutting quality can be improved by preventing or reducing discoloration of the machining end portion when an inner hole is cut out during laser machining and time and effort for secondary machining after cutting can be omitted or reduced.

DESCRIPTION OF EMBODIMENTS

Exemplary embodiments of a laser machining apparatus according to the present invention will be explained below in detail with reference to the drawings. This invention is not limited to the embodiments.

First Embodiment

Figure 1:
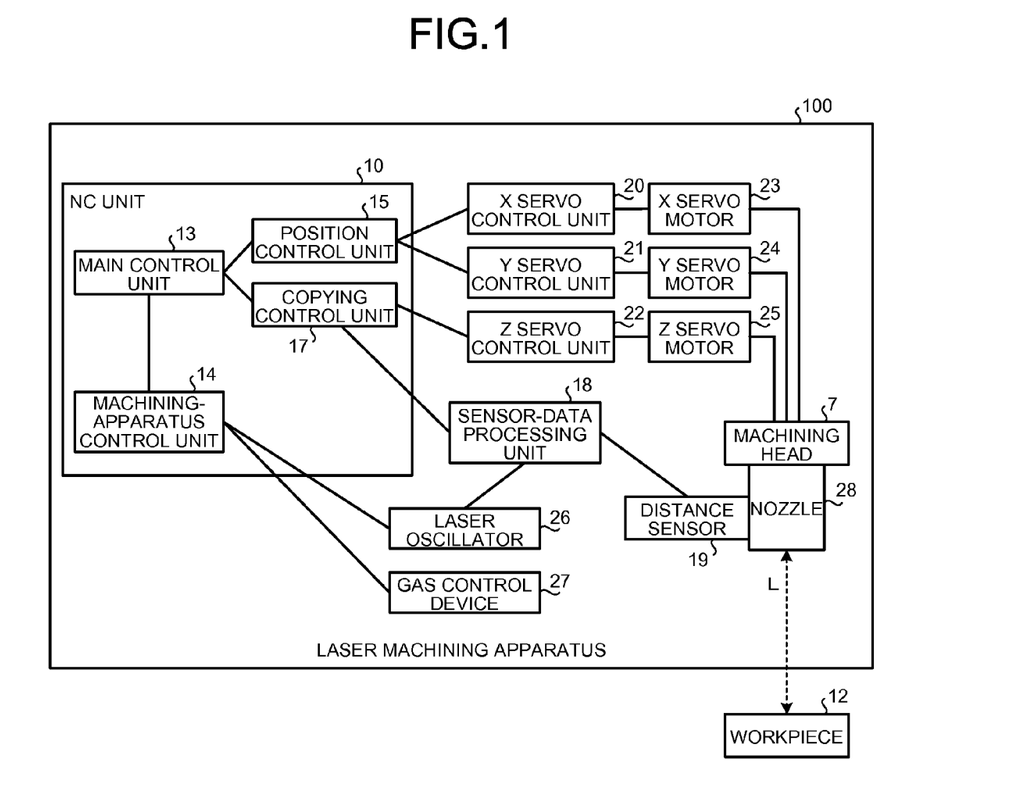
FIG. 1 is a diagram illustrating a configuration of a laser machining apparatus according to a first embodiment of the present invention.

FIG. 1 is a diagram illustrating a configuration of a laser machining apparatus according to a first embodiment of the present invention. A laser machining apparatus 100 includes an NC unit 10, a sensor-data processing unit 18, a distance sensor 19, an X servo control unit 20, a Y servo control unit 21, a Z servo control unit 22, an X servo motor 23, a Y servo motor 24, a Z servo motor 25, a laser oscillator 26, and a gas control device 27. The NC unit 10 includes a main control unit 13, a machining-apparatus control unit 14, a position control unit 15, and a copying control unit 17.

The distance sensor 19 measures a distance L between a nozzle 28 and a workpiece 12. There are various types of the distance sensor 19 and an explanation will be given, as an example, of a case where the distance sensor 19 is a capacitance sensor. However, sensors other than a capacitance sensor, such as an optical sensor, are definitely also applicable. The sensor-data processing unit 18 samples sensor data (a voltage value according to the capacitance between the distance sensor 19 and the workpiece 12) from the distance sensor 19 with an operation period shorter than that of the main control unit 13. When sampled sensor data is smaller than a predetermined value (i.e., when the distance between the nozzle 28 and the workpiece 12 is larger than a predetermined value), the sensor-data processing unit 18 outputs a stop instruction to the laser oscillator 26.

Each of the servo motors 23 to 25 of the respective axes X, Y, and Z includes a position detector for its corresponding axis.

An explanation will be given of the control when machining is performed in accordance with an NC program with reference to FIG. 1. The main control unit 13 analyzes a machining NC program block by block and provides information corresponding to the instruction content of the program to each control unit in the subsequent stage.

When the program instruction is an instruction to the laser oscillator 26 and the gas control device 27, such as ON/OFF of laser light, machining gas, and a workpiece clamp, the main control unit 13 provides instruction information to the machining-apparatus control unit 14. The machining-apparatus control unit 14 provides a signal to the laser oscillator 26 and the gas control device 27 in accordance with the instruction information. The laser oscillator 26 and the gas control device 27 cause a laser light output, a machining gas solenoid valve, and the like to be turned on/off in accordance with the instruction signal. In contrast, signals of a limit switch, various sensors, and the like from the laser oscillator 26 and the gas control device 27 are transmitted to the main control unit 13 via the machining-apparatus control unit 14; therefore, the NC unit 10 can be provided with the conditions of the laser oscillator 26 and the gas control device 27.

When the program instruction is a position instruction, the main control unit 13 provides information on the moving position, moving speed, and the like to the position control unit 15. The position control unit 15 calculates the moving distance in accordance with the provided information and outputs the amount of movement to the X servo control unit 20 and the Y servo control unit 21 by distributing the calculated moving distance to the X and Y axes. At the same time, the position control unit 15 also manages the actual position and the like on the basis of the amount of movement output with respect to the instructed moving distance, the remaining moving distance, and information from the X servo control unit 20 and the Y servo control unit 21. The X servo control unit 20 and the Y servo control unit 21 drive the X servo motor 23 and the Y servo motor 24, respectively, to move a machining head 7 relative to the workpiece 12. In this manner, the machining head 7 is moved in accordance with the shape that the program instructs, thereby performing machining. In contrast, the position control unit 15 transmits information, such as the position, the output amount of movement, and the remaining moving distance, to the main control unit 13.

Next, an explanation will be given of the control of a copying function. When the program instruction is an instruction to turn on/off the copying function, the main control unit 13 provides instruction information to the copying control unit 17. When the copying control unit 17 is instructed to turn on the copying function, the copying control unit 17 compares the information on the distance L input from the sensor-data processing unit 18 with a predetermined distance, which is present, and outputs the amount of movement to the Z servo control unit 22 such that the difference is eliminated. The Z servo control unit 22 drives the Z servo motor 25 to move the machining head 7 vertically. The distance sensor 19 outputs sensor data corresponding to the distance L between the nozzle 28 and the workpiece 12 and the sensor data is fed back to the copying control unit 17 via the sensor-data processing unit 18. In this manner, when the distance L changes due to the deformation or the like of the workpiece 12, the sensor data changes. The Z-axis position changes in accordance with this change; therefore, the distance L between the machining head 7 and the workpiece 12 is always maintained at the set predetermined distance. In contrast, the copying control unit 17 transmits the information on the copying condition to the main control unit 13.

Figure 2A:
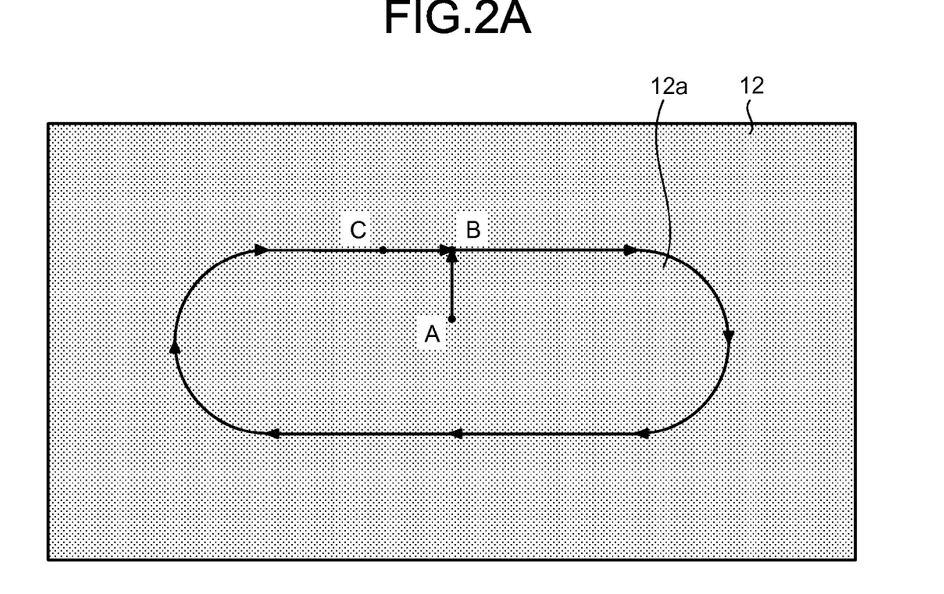
FIG. 2A is a diagram illustrating an example of a machining path during inner hole machining.
Figure 2B:
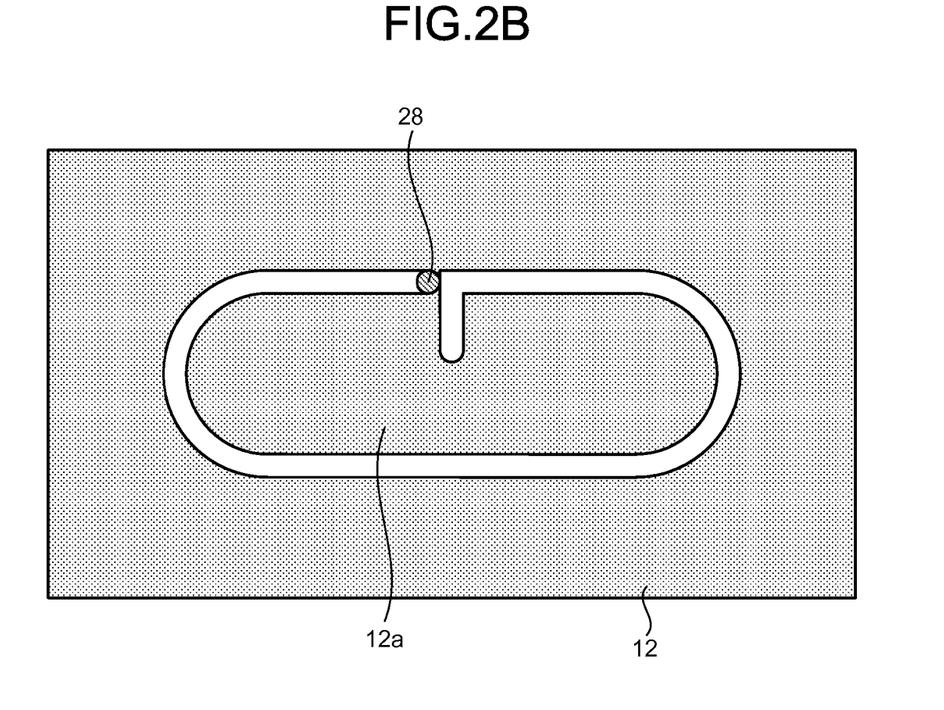
FIG. 2B is a diagram illustrating an example of a machining path during inner hole machining.

Next, an operation when inner hole machining is performed will be explained. FIG. 2A and FIG. 2B are diagrams illustrating an example of inner hole machining. FIG. 2A illustrates an example of a machining path during inner hole machining and FIG. 2B schematically illustrates the state of the workpiece at the moment when the waste comes off. The machining path illustrated in FIG. 2A is a path formed by emitting laser light to the workpiece 12 with the point A set as a machining start point, cutting through the waste toward the point B, which is the edge of the hole, and then following the edge of the hole such that the portion to be cut off as a waste 12a is surrounded and reaching the point B again. Because the laser light has a certain width and a force is applied to the workpiece 12 due to the pressure of the gas ejected from the nozzle, the waste 12a comes off before the nozzle 28 reaches the machining path end as illustrated in FIG. 2B. When inner hole machining is performed with such a machining path by using a conventional laser machining apparatus, the portion near the point B is irradiated with the laser light twice, i.e., at the time of cutting through the workpiece 12 from the point A, which is the machining start point, and at the time of cutting through the workpiece 12 from the side of the point C immediately before the end of the machining. Consequently, the occurrence of discoloration in the workpiece 12 due to the second laser irradiation becomes a problem.

Figure 3:
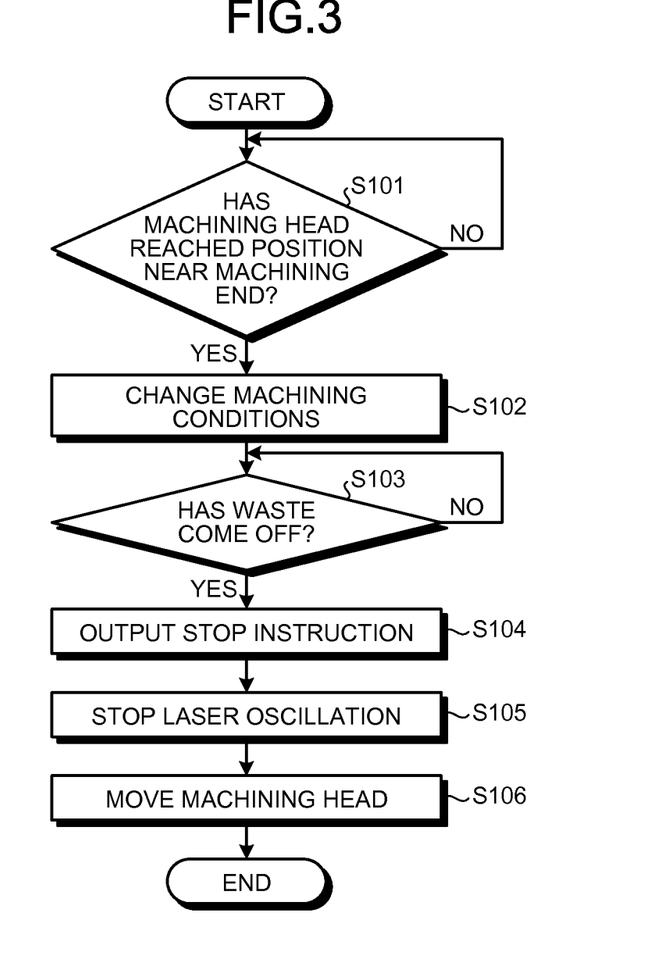
FIG. 3 is a flowchart illustrating the flow of an operation of the laser machining apparatus when inner hole machining is performed.

FIG. 3 is a flowchart illustrating the flow of an operation of the laser machining apparatus 100 when inner hole machining is performed. During laser machining, the main control unit 13 monitors whether the machining head 7 has reached a predetermined position (for example, the point C in FIG. 2) near the machining end (Step S101). The predetermined position in this case is defined in the machining NC program. Until the machining head 7 reaches the predetermined position near the machining end (No in Step S101), laser machining continues under normal machining conditions (continuous wave) (Step S101). When the machining head 7 has reached the predetermined position (Yes in Step S101), the main control unit 13 changes the machining conditions such that the pulse interval becomes equal to or more than the operation period of the sensor-data processing unit 18 (Step S102). Specifically, the main control unit 13 sends an instruction to the X servo control unit 20 and the Y servo control unit 21 via the position control unit 15 to reduce the moving speed of the machining head 7. Moreover, the main control unit 13 sends an instruction to the laser oscillator 26 via the machining-apparatus control unit 14 to change the laser oscillation method from continuous oscillation to pulse oscillation and sets the oscillation frequency equal to or less than the operation period (sampling period) of the sensor-data processing unit 18. Moreover, the main control unit 13 reduces the duty ratio of the laser light. Because the machining conditions are changed as above, the detection accuracy (spatial resolution) at the portion from which the waste has come off can be improved.

After the machining conditions are changed, the sensor-data processing unit 18 monitors the output from the distance sensor 19 (Step S103). When the waste 12a comes off during the inner hole machining, the capacitance between the distance sensor 19 and the workpiece 12 becomes zero and thus the voltage input to the sensor-data processing unit 18 from the distance sensor 19 in accordance with the capacitance becomes zero. Therefore, when the voltage input from the distance sensor 19 becomes lower than a predetermined value, the sensor-data processing unit 18 determines that the waste 12a has come off. Until the waste 12a comes off (No in Step S103), laser machining continues under the machining conditions that were changed in Step S102 (Step S103).

When the sensor-data processing unit 18 detects that the waste 12a has come off (Yes in Step S103), the sensor-data processing unit 18 outputs a stop instruction to the laser oscillator 26 (Step S104). Because the laser oscillation method is changed to pulse oscillation, whenever a stop instruction is output, if it is before the next pulse is generated, the occurrence of discoloration can be prevented.

The laser oscillator 26 stops laser oscillation in accordance with the stop instruction from the sensor-data processing unit 18 (Step S105).

After the laser oscillator 26 stops laser oscillation, the main control unit 13 moves the machining head 7 to the machining end in accordance with the NC program (Step S106). Although the main control unit 13 outputs an instruction to oscillate laser light to the laser oscillator 26, the laser oscillator 26 cancels the instruction in accordance with the stop instruction from the sensor-data processing unit 18; therefore, the laser light is not oscillated.

Figure 4:
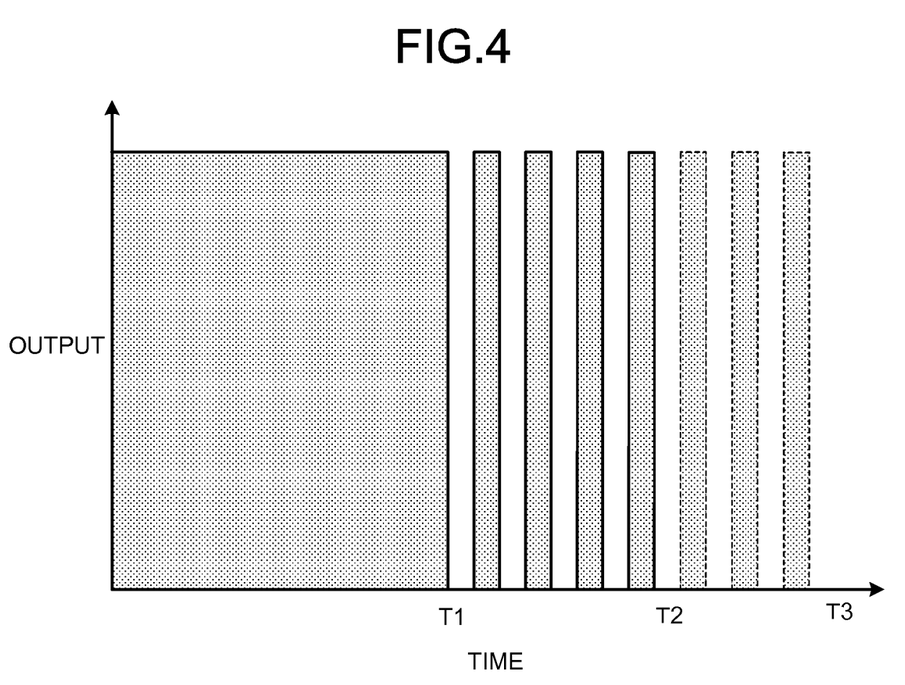
FIG. 4 is a diagram illustrating an example of a change of a machining condition.

FIG. 4 is a diagram schematically illustrating an example of a change in laser output when inner hole machining is performed. In FIG. 4, the pulses indicated by broken lines represent pulses after the laser oscillator 26 stops oscillation by the stop instruction from the sensor-data processing unit 18. At the time T1, because the machining head 7 has reached a specific position near the machining end, the laser oscillation method is switched from continuous oscillation to pulse oscillation. At the time T2, because the sensor-data processing unit 18 detects that the waste 12a has come off, after the time T2, laser oscillation is stopped during the time period until the time T3 at which the machining head 7 reaches the machining end.

Figure 5:
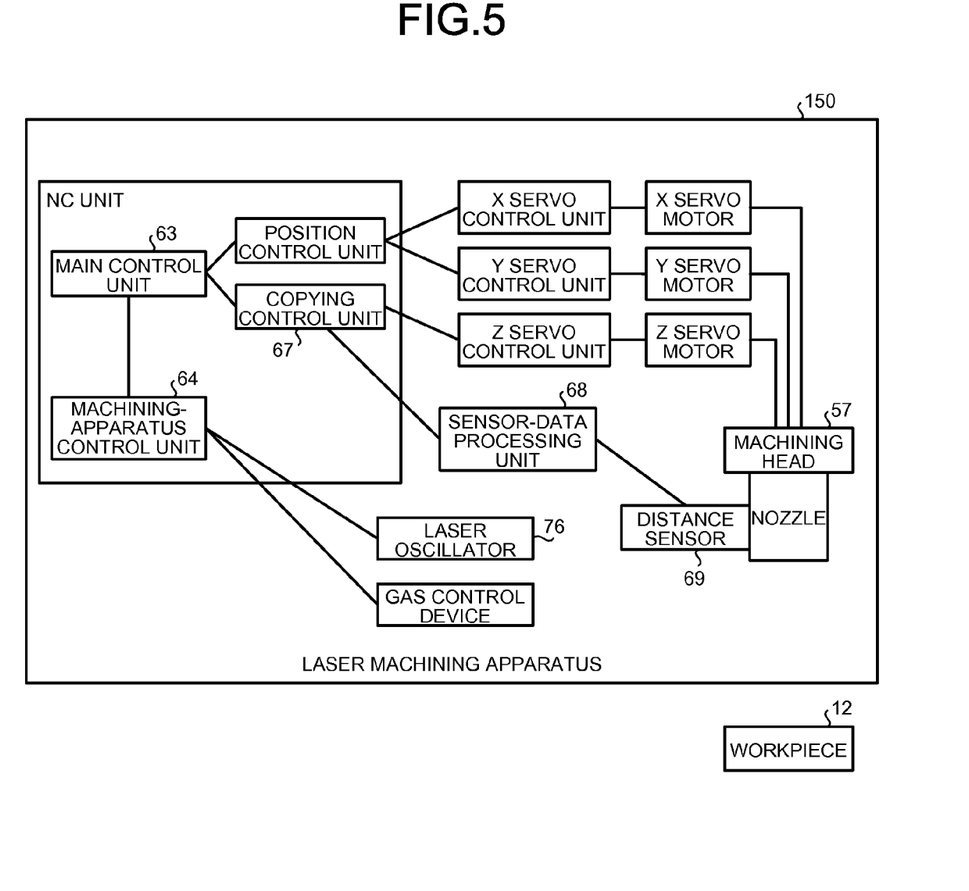
FIG. 5 is a diagram illustrating a configuration of a conventional laser machining apparatus.
Figure 6:
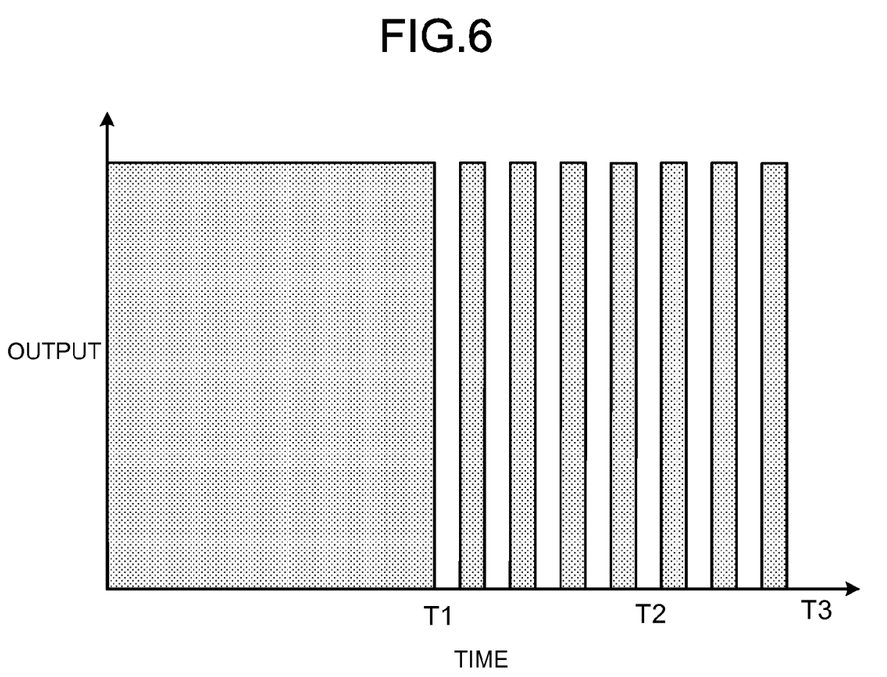
FIG. 6 is a diagram schematically illustrating an example of a change in laser output when inner hole machining is performed by the conventional laser machining apparatus.

For comparison, an explanation will be given of an operation when a laser oscillator is stopped on the basis of sensor data from a distance sensor in a conventional laser machining apparatus. FIG. 5 is a diagram illustrating a configuration of a conventional laser machining apparatus. FIG. 6 is a diagram schematically illustrating an example of a change in laser output when inner hole machining is performed by the conventional laser machining apparatus. In a conventional laser machining apparatus 150, data that a sensor-data processing unit 68 obtains from a distance sensor 69 when the waste 12a comes off is output to a copying control unit 67 and is then output from the copying control unit 67 to a main control unit 63. In response to the input of the sensor data when the waste 12a comes off, the main control unit 63 sends a stop instruction to a laser oscillator 76 via a machining-apparatus control unit 64 to stop the laser oscillator 76, whereby the laser oscillation is stopped. Accordingly, the process performed in the main control unit 63, whose operation period is long, behaves as a bottleneck; therefore, after the waste 12a comes off, the laser oscillator 76 cannot be stopped before the next pulse laser is output. In other words, even if the laser oscillation method is switched from continuous oscillation to pulse oscillation at the time T1 at which a machining head 57 reaches a specific position near the machining end and the sensor-data processing unit 68 detects, at the time T2, that the waste 12a has come off in a similar manner to the laser machining apparatus 100 according to the first embodiment, laser oscillation continues during the time period until the time T3 at which the machining head 57 reaches the machining end. Thus, in the conventional laser machining apparatus 150, discoloration occurs in the workpiece 12 near the machining end.

As above, according to the present embodiment, after the distance sensor detects that the waste 12a has come off when inner hole machining is performed, laser oscillation is stopped. Accordingly, discoloration can be prevented from occurring in the workpiece near the machining end. Thus, it is possible to omit time and effort for secondary machining to remove the discolored portion.

Second Embodiment

Figure 7:
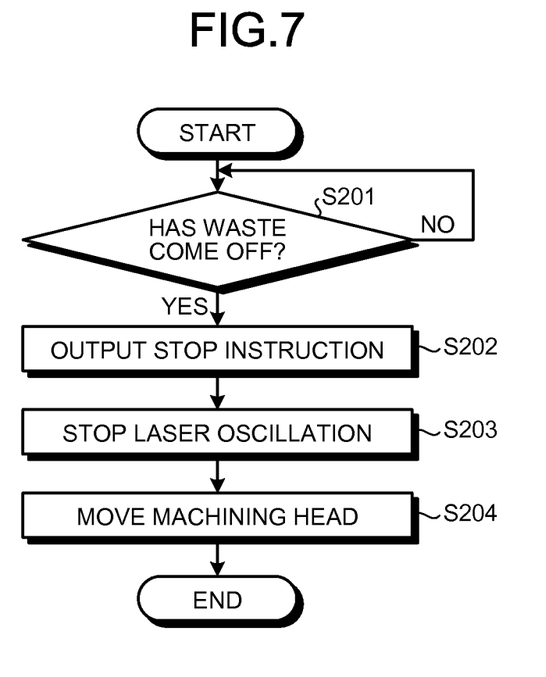
FIG. 7 is a flowchart illustrating the flow of an operation of a laser machining apparatus according to a second embodiment when inner hole machining is performed.

The configuration of a laser machining apparatus according to the second embodiment of the present invention is similar to that in the first embodiment. FIG. 7 is a flowchart illustrating the flow of an operation of the laser machining apparatus 100 according to the second embodiment when inner hole machining is performed. In the operation according to the present embodiment, the machining conditions are not changed near the machining end. In other words, the operation is such that the processing corresponding to Step S101 and Step S102 in FIG. 3 is omitted and the processing in Step S201 to Step S204 is similar to the processing in Step S103 and Step S106 in the first embodiment.

In the present embodiment, if the operation period of the sensor-data processing unit 18 is shorter than the oscillation period during normal laser machining, laser oscillation can be stopped immediately after it is detected that the waste 12a comes off without changing the machining condition. Therefore, it is possible to obtain an effect of preventing discoloration near the machining end in a similar manner to the first embodiment. Moreover, even if the operation period of the sensor-data processing unit 18 is longer than the oscillation period during normal laser machining, because the operation period of the sensor-data processing unit 18 is shorter than the processing period of the main control unit 13, a stop instruction can be output to the laser oscillator 26 at the timing before the case of the conventional laser machining apparatus 150 illustrated in FIG. 5; therefore, it is possible to obtain an effect of reducing the occurrence of discoloration near the machining end. Accordingly, the laser machining apparatus 100 according to the present embodiment can omit or reduce time and effort for secondary machining to remove the discolored portion.

INDUSTRIAL APPLICABILITY

As described above, the laser machining apparatus according to the present invention is useful in that it can prevent or reduce the occurrence of discoloration near the machining end in inner hole machining.

REFERENCE SIGNS LIST

10 NC unit, 12 workpiece, 12a waste, 13 main control unit, 14 machining-apparatus control unit, 15 position control unit, 17 copying control unit, 18 sensor-data processing unit, 19 distance sensor, 20 X servo control unit, 21 Y servo control unit, 22 Z servo control unit, 23 X servo motor, 24 Y servo motor, 25 Z servo motor, 26 laser oscillator, 27 gas control device, nozzle, 100 laser machining apparatus.

The invention claimed is:

1. A laser machining apparatus that performs inner hole machining of forming a through hole in a workpiece by emitting laser light to the workpiece, the apparatus comprising:
    a main control unit that executes a numerical control program;
    a laser oscillator that oscillates the laser light in accordance with an instruction from the main control unit;
    a distance sensor that measures a distance between a nozzle and the workpiece;
    a sensor-data processing unit that samples a measured value of the distance sensor; and
    a copying control unit that moves the machining head such that a distance between the nozzle and the workpiece is maintained constant on a basis of a measured value of the distance sensor input from the sensor-data processing unit, wherein
    the laser oscillator is directly connected to the sensor-data processing unit, and
    the sensor-data processing unit samples a measured value of the distance sensor with a sampling period shorter than a period where the main control unit executes the numerical control program and outputs information and, when a portion corresponding to the through hole in the workpiece comes off and a distance between the nozzle and the workpiece becomes larger than a predetermined value during the inner hole machining, the sensor-data processing unit causes the laser oscillator to stop oscillation of the laser light by outputting a stop signal directly to the laser oscillator so as to avoid edge of the through hole being irradiated with the laser light twice,
    wherein the laser light is emitted to the workpiece while moving a machining head, on which a nozzle is mounted, approximately circularly in accordance with the numerical control program, wherein
    the main control unit causes the laser oscillator to oscillate laser light with an oscillation period shorter than the sampling period of the sensor-data processing unit until the machining head reaches a predetermined position near a machining end in the inner hole machining specified by the numerical control program and, when the machining head reaches the predetermined position near the machining end, sets an oscillation period of the laser oscillator equal to or longer than the sampling period and changes a moving speed of the machining head in accordance with an oscillation period of the laser oscillator.

2. The laser machining apparatus according to claim 1, wherein the main control unit causes the laser oscillator to oscillate laser light by continuous oscillation until the machining head reaches the predetermined position near the machining end and, after the machining head reaches the predetermined position near the machining end, causes the laser oscillator to oscillate laser light by pulse oscillation.

* * * * *